(12) United States Patent
Yang et al.

(10) Patent No.: US 11,931,729 B2
(45) Date of Patent: Mar. 19, 2024

(54) IRON-PROMOTED ZEOLITE AND CATALYST MADE THEREFROM

(71) Applicant: BASF CORPORATION, Florham Park, NJ (US)

(72) Inventors: Jeff H. Yang, Glen Rock, NJ (US); Stanley A. Roth, Yardley, PA (US); Robin M. Huff, South Plainfield, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 17/637,094

(22) PCT Filed: Aug. 12, 2020

(86) PCT No.: PCT/US2020/045837
§ 371 (c)(1),
(2) Date: Feb. 22, 2022

(87) PCT Pub. No.: WO2021/041024
PCT Pub. Date: Mar. 4, 2021

(65) Prior Publication Data
US 2022/0280924 A1 Sep. 8, 2022

Related U.S. Application Data

(60) Provisional application No. 62/893,543, filed on Aug. 29, 2019.

(51) Int. Cl.
*B01J 29/76* (2006.01)
*B01D 53/94* (2006.01)
(Continued)

(52) U.S. Cl.
CPC ...... *B01J 29/7615* (2013.01); *B01D 53/9418* (2013.01); *B01J 35/04* (2013.01);
(Continued)

(58) Field of Classification Search
CPC .... B01J 29/7615; B01J 35/04; B01J 37/0225; B01J 37/10; B01J 37/30; B01J 2229/186;
(Continued)

(56) References Cited

U.S. PATENT DOCUMENTS 4,961,917 A 10/1990 Byrne
8,865,121 B2 10/2014 Xiao et al.
(Continued)

FOREIGN PATENT DOCUMENTS

| KR | 2008 0 113 565 | * 12/2008 | ............. B01J 29/46 |
| WO | 03/022430 A2 | 3/2003 | |
| WO | 2018/101718 A1 | 6/2018 | |

OTHER PUBLICATIONS

Bleken, et al., "The Effect of Acid Strength on the Conversion of Methanol to Olefins Over Acidic Microporous Catalysts with the CHA Topology", Topics in Catalysis, vol. 52, Issue 3, Jan. 7, 2009, pp. 218-228.
(Continued)

*Primary Examiner* — Timothy C Vanoy
(74) *Attorney, Agent, or Firm* — Baltazar Gomez

(57) ABSTRACT

The present disclosure provides a method of forming a selective catalytic reduction (SCR) catalyst, the method including receiving a first iron-promoted zeolite having a first iron content, and treating the iron-promoted zeolite with additional iron in an ion exchange step to form a second iron-promoted zeolite with a second iron content, the second iron content being higher than the first iron content. A selective catalytic reduction (SCR) catalyst composition including an ironpromoted zeolite having at least about 6 weight percent iron, based on total weight of the ironpromoted zeolite, wherein the iron content of the zeolite was added to the zeolite in at least two separate steps is also provided herein.

18 Claims, 5 Drawing Sheets

(51) Int. Cl.
| | |
|---|---|
| *B01J 35/04* | (2006.01) |
| *B01J 37/02* | (2006.01) |
| *B01J 37/10* | (2006.01) |
| *B01J 37/30* | (2006.01) |
| *F01N 3/10* | (2006.01) |
| *F01N 3/20* | (2006.01) |
| *F01N 3/28* | (2006.01) |
| *F01N 13/00* | (2010.01) |

(52) U.S. Cl.
CPC .......... *B01J 37/0225* (2013.01); *B01J 37/10* (2013.01); *B01J 37/30* (2013.01); *F01N 3/106* (2013.01); *F01N 3/2066* (2013.01); *F01N 3/2803* (2013.01); *F01N 13/009* (2014.06); *B01D 2255/20715* (2013.01); *B01D 2255/20738* (2013.01); *B01D 2255/502* (2013.01); *B01D 2255/9155* (2013.01); *B01J 2229/186* (2013.01); *F01N 2370/04* (2013.01)

(58) Field of Classification Search
CPC ...... F01N 13/009; F01N 3/106; F01N 3/2066; F01N 3/2803; F01N 2370/04; B01D 53/9418; B01D 2255/20715; B01D 2255/20738; B01D 2255/502; B01D 2255/9155

See application file for complete search history.

(56) References Cited

U.S. PATENT DOCUMENTS

| | | |
|---|---|---|
| 2009/0048095 A1 | 2/2009 | Li et al. |
| 2010/0172814 A1 | 7/2010 | Bull et al. |
| 2011/0305613 A1 | 12/2011 | Stiebels et al. |
| 2012/0208692 A1 | 8/2012 | Munch et al. |
| 2013/0004398 A1* | 1/2013 | Grossschmidt .......... B01J 29/76 423/239.2 |
| 2018/0022611 A1 | 1/2018 | Feyen et al. |

OTHER PUBLICATIONS

Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.

International Search Report for PCT Patent Application No. PCT/US2020/45837, dated Nov. 24, 2020, 4 pages.

* cited by examiner

IRON-PROMOTED ZEOLITE AND CATALYST MADE THEREFROM

CROSS-REFERENCE TO RELATED APPLICATIONS

This application is a national stage filing under 35 U.S.C. 371 of PCT/US2020/045837, filed on Aug. 12, 2020, which claims the benefit of priority to U.S. Provisional Application No. 62/893,543, filed on Aug. 29, 2019, which applications are hereby incorporated in their entirety by reference in this application.

FIELD OF THE INVENTION

The present invention relates to iron promoted zeolite-containing SCR catalyst compositions, methods for the preparation and use of such catalyst compositions for lean emission control applications, and catalyst articles and systems employing such catalyst compositions.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a hydrocarbon is used as a reducing agent; and (2) a selective reduction process wherein ammonia or an ammonia precursor is used as a reducing agent. In the selective reduction process, a high degree of nitrogen oxide removal can be achieved with a stoichiometric amount of reducing agent.

The selective reduction process is referred to as a SCR (Selective Catalytic Reduction) process. The SCR process uses catalytic reduction of nitrogen oxides with a reductant (e.g., ammonia) in the presence of excess oxygen, resulting in the formation predominantly of nitrogen and steam:

$$4NO + 4NH_3 + O_2 \rightarrow 4N_2 + 6H_2O \quad \text{(standard SCR reaction)}$$

$$2NO_2 + 4NH_3 + O_2 \rightarrow 3N_2 + 6H_2O \quad \text{(slow SCR reaction)}$$

$$NO + NO_2 + 2NH_3 \rightarrow 2N_2 + 3H_2O \quad \text{(fast SCR reaction)}$$

Catalysts employed in the SCR process ideally should be able to retain good catalytic activity over a wide range of temperature conditions of use, for example, 200° C. to 600° C. or higher, under hydrothermal conditions. SCR catalysts used in exhaust emission control applications are exposed to high temperature hydrothermal conditions during the regeneration of a soot filter, a component of the exhaust gas treatment system used for the removal of particles.

Molecular sieves such as zeolites have been used in the selective catalytic reduction (SCR) of nitrogen oxides with a reductant such as ammonia, urea, or a hydrocarbon in the presence of oxygen. Zeolites are crystalline materials having uniform pore sizes which, depending upon the type of zeolite and the type and amount of cations included in the ion exchange sites, range from about 3 to about 10 Angstroms in diameter.

Metal-promoted zeolite catalysts including, among others, iron-promoted and copper-promoted zeolite catalysts, for the selective catalytic reduction of nitrogen oxides with ammonia are known. For example, iron-promoted zeolite beta has been an effective commercial catalyst for the selective reduction of nitrogen oxides with ammonia, e.g., as described in U.S. Pat. No. 4,961,917.

There is always a desire for improved performance of catalysts and, accordingly, it would be beneficial to provide SCR catalysts with improved low and/or high temperature performance.

SUMMARY

The present disclosure provides catalyst compositions comprising a selective catalytic reduction (SCR) catalyst composition comprising an iron-promoted zeolite comprising, for example, at least about 6 weight percent iron, based on total weight of the iron-promoted zeolite, wherein the iron content of the zeolite was added to the zeolite in at least two separate steps. The catalyst compositions described herein can be disposed on a substrate. The porous substrate can be a flow-through porous monolith or a wall-flow filter for example.

A method of forming a selective catalytic reduction (SCR) catalyst is also provided herein, the method comprising receiving a first iron-promoted zeolite having a first iron content, and treating the iron-promoted zeolite with additional iron in an ion exchange step to form a second iron-promoted zeolite with a second iron content, the second iron content being higher than the first iron content. In various embodiments, the first iron content is from about 2 to about 8 wt % and the second iron content is about 6 to about 10 wt %, based on the total weight of the iron-promoted zeolite. The second iron content can be at least about 15% greater than the first iron content, more particularly at least about 20% higher. The methods described herein can further include preparing an SCR catalyst article by coating a porous substrate with the second iron-promoted zeolite.

In various embodiments, the iron-promoted zeolite is a zeolitic material having a BEA framework structure, wherein the BEA framework structure comprises $YO_2$ and $X_2O_3$, wherein Y is a tetravalent element, and X is a trivalent element. In some embodiments, Y is selected from the group consisting of Si, Sn, Ti, Zr, Ge, and combinations of two or more thereof, and X is selected from the group consisting of Al, B, In, Ga, Fe and combinations of two or more thereof. In certain embodiments, Y is Si and X is Al. In various embodiments, the zeolitic material having a BEA framework structure is obtained from an organo-template-free synthetic process, as described in U.S. Pat. No. 8,865,121, which is incorporated herein in its entirety. The iron-promoted zeolite can have a silica-to-alumina molar ratio (SAR) of about 10 or less, or about 5 or less.

As described in more detail below, a fresh sample of the second iron-promoted zeolite with a second iron content according to the present disclosure has a NOx conversion percentage at least about 15% higher, more particularly at least about 20% or 25% or 30% or 35% or 40% higher, than a fresh sample of the first iron-promoted zeolite at a temperature of 250° C.

An engine exhaust gas treatment system is also provided herein, the system comprising a catalyst composition made according to the present disclosure and an exhaust gas conduit in fluid communication with a lean burn engine, wherein the catalyst composition (i.e., second iron-promoted zeolite) is downstream of the exhaust gas conduit. In various embodiments, the engine is a diesel engine. A method of removing nitrogen oxides from exhaust gas from a lean burn engine is also provided herein, the method comprising contacting an exhaust gas stream from a lean burn engine with the catalyst composition prepared according to the present disclosure (i.e., a second iron-promoted zeolite).

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1A:
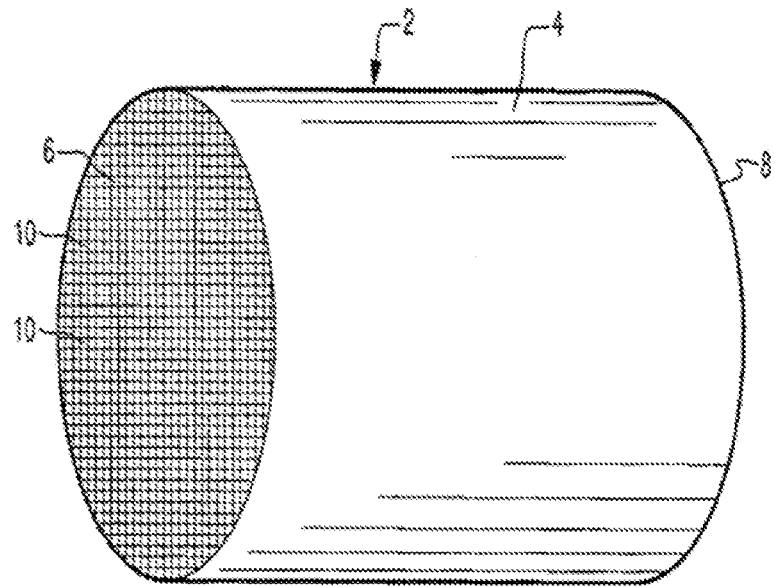
FIG. 1A is a perspective view of a honeycomb-type substrate which may comprise a catalyst composition in accordance with the present invention.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates.

The present disclosure generally provides catalyst compositions, e.g., SCR catalyst compositions, suitable for at least partial conversion of $NO_x$ emissions from an engine, such as a diesel or a gasoline engine. The catalyst compositions generally comprise one or more metal-promoted molecular sieves (e.g., zeolites), and can be prepared and coated onto a substrate using a washcoat technique as set forth more fully below. The catalyst compositions described herein generally include an iron-promoted zeolite, wherein the iron content of the zeolite is added to the zeolite in at least two separate steps. The catalyst compositions disclosed herein can provide enhanced low temperature performance. In particular, the disclosed compositions exhibit improved $NO_x$ conversion at low temperatures as compared with a comparable composition that has not undergone two separate iron additions. Additionally, the disclosed compositions exhibit equivalent low $N_2O$ formation levels observed for other Fe-zeolite SCR catalysts.

Catalyst Composition

The catalyst compositions disclosed herein generally comprise a selective catalytic reduction (SCR) catalyst composition comprising an iron-promoted molecular sieve comprising, for example, at least about 6 weight percent iron, based on total weight of the iron-promoted molecular sieve, wherein the iron content of the molecular sieve was added to the molecular sieve in at least two separate steps. The phrase "molecular sieve," as used herein refers to framework materials such as zeolites and other framework materials (e.g., isomorphously substituted materials), which may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. According to one or more embodiments, it will be appreciated that defining the molecular sieves by their structure type is intended to include both molecular sieves having that structure type and any and all isotypic framework materials such as SAPO, AlPO and MeAPO materials having the same structure type.

In more specific embodiments, reference to an aluminosilicate zeolite structure type limits the material to molecular sieves that do not purposely include phosphorus or other metals substituted in the framework. To be clear, as used herein, "aluminosilicate zeolite" excludes aluminophosphate materials such as SAPO, AlPO, and MeAPO materials, and the broader term "zeolite" is intended to include aluminosilicates and aluminophosphates. Zeolites are crystalline materials, understood to be aluminosilicates with open 3-dimensional framework structures composed of corner-sharing $TO_4$ tetrahedra, where T is Al or Si. Zeolites generally comprise silica to alumina (SAR) molar ratios of 1 or greater. Zeolites for use in the disclosed catalyst compositions are not particularly limited in terms of SAR values, although the particular SAR value associated with a zeolite may, in some embodiments, affect the SCR performance of the catalyst composition into which it is incorporated (e.g., particularly after aging). In some embodiments, the SAR values of the zeolites are from about 2 to about 100 or about 2 to about 15. In some embodiments, the SAR is about 10 or less and, in other embodiments, the SAR is about 5 or less.

Cations that balance the charge of the anionic framework are loosely associated with the framework oxygens, and the remaining pore volume may be potentially filled with water molecules. The non-framework cations are generally exchangeable, and the water molecules removable. Zeolites typically have rather uniform pore sizes which, depending upon the type of zeolite and the type and amount of cations included in the zeolite lattice, range from about 3 to 10 Angstroms in diameter.

Molecular sieves can be classified by means of the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more specific embodiments of the present disclosure, the zeolites of the catalyst compositions have the BEA structure type. In various embodiments, the zeolitic material has a BEA framework structure, wherein the BEA framework structure comprises $YO_2$ and $X_2O_3$, wherein Y is a tetravalent element, and X is a trivalent element. In some embodiments, Y is selected from the group consisting of Si, Sn, Ti, Zr, Ge, and combinations of two or more thereof, and X is selected from the group consisting of Al, B, In, Ga, Fe, and combinations of two or more thereof. In certain embodiments, Y is Si and X is Al. In various embodiments, the zeolitic material with BEA structure type is zeolite Beta, which is a zeolite containing $SiO_2$ and $Al_2O_3$ in its framework and has a three-dimensional 12-membered-ring (12MR) pore/channel system.

In various embodiments of the present disclosure, the zeolites of the catalyst compositions can be low silica-alumina ratio (SAR) Beta zeolites prepared by a template-free process. Methods for making template-free Beta zeolites are known in the art. See, for example, the processes described in U.S. Pat. Pub. No. 2018/0022611 to Feyen et al., which is herein incorporated by reference in its entirety. As described in U.S. Pat. Pub. No. 2018/0022611 to Feyen et al., zeolitic materials having a BEA framework structure can be obtained from an organo-template-free synthetic process. Template-free zeolites having a BEA framework structure can have an SAR ratio of about 10 or less, or about 5 or less, which is lower than other zeolites having a BEA framework structure which are not template-free. Other template methods of synthesizing Beta zeolite typically yield silica-alumina ratio (SAR) greater than 30. Without being limited by theory, such higher SAR does not provide sufficient ion-exchange sites for the catalytic enhancement observed by this double iron exchange method disclosed herein.

As referenced herein above, the disclosed catalyst compositions generally comprise molecular sieves (e.g., Beta zeolites) that are metal-promoted. As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments according to the present disclosure, a suitable metal is exchanged into the molecular sieves. Copper and iron participate in the conversion of nitrogen oxides and thus may be a particularly useful metal for exchange. Accordingly, in particular embodiments, a catalyst composition is provided which comprises an iron-promoted molecular sieve (e.g., zeolite), e.g., Fe-BEA. However, the invention is not intended to be limited thereto, and catalyst compositions comprising other metal-promoted molecular sieves are also encompassed hereby. As described in more detail below, the catalyst compositions described herein include molecular sieves (e.g., zeolites) which have undergone two separate metal (e.g., iron) promotion processes. However, in certain embodiments, iron can be replaced in the process of the present disclosure with other promoter metals.

Promoter metals can generally be selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Certain promoter metals that can, in various embodiments, be used to prepare metal-promoted molecular sieves include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted molecular sieve, e.g., Cu—Fe-BEA. In certain embodiments, the promoter metal associated with the disclosed zeolite component comprises copper (e.g., as CuO), iron (e.g., as $Fe_2O_3$), or manganese (e.g., as $MnO_2$).

The promoter metal content of a metal-promoted molecular sieve, calculated as the oxide, is, in one or more embodiments, at least about 0.1 wt %, based on the total weight of the calcined molecular sieve (including promoter) and reported on a volatile-free basis. In specific embodiments, the promoter metal of the zeolite component comprises Fe, and the Fe content, calculated as $Fe_2O_3$ is in the range of about 0.1 wt % to about 20 wt %, including about 0.5 wt % to about 17 wt %, about 2 wt % to about 15 wt %, or about 2 wt % to about 10 wt %, in each case based on the total weight of the calcined molecular sieve reported on a volatile free basis. In some embodiments, the zeolite component (including promoter metal) can be defined by the ratio of promoter metal to aluminum within the promoted zeolite. For example, in some embodiments, the promoter metal to aluminum molar ratio is about 0.1 to about 0.5 (e.g., the Fe/Al ratio is about 0.1 to about 0.5). In some embodiments, the promoter metal to aluminum molar ratio is about 0.1 to about 0.33 (e.g., the Fe/Al ratio is about 0.1 to about 0.33). In some embodiments, there may be excess $Fe_2O_3$ that is not ion-exchanged.

As described herein, the zeolitic material (e.g., a template-free Beta zeolite) is metal-promoted with a first metal (e.g., Fe) content and referred to herein as a first iron-promoted zeolite. For ease of disclosure, we will refer to the promoter metal as Fe, however, the present disclosure is not intended to be limited to iron-promoted zeolites. The first iron content of the first iron-promoted zeolite, calculated as $Fe_2O_3$ is in the range of about 2 wt % to about 10 wt %, including about 4 wt % to about 8 wt %, or about 6 wt % to about 8 wt %, in each case based on the total weight of the calcined molecular sieve reported on a volatile free basis.

The first iron-promoted zeolite is treated with additional iron to form an iron-promoted zeolite of the present disclosure having a second iron content. The second iron content of the iron-promoted zeolite according to the present disclosure, calculated as $Fe_2O_3$ is in the range of about 4 wt % to about 20 wt %, including about 6 wt % to about 15 wt %, or about 8 wt % to about 15 wt %, in each case based on the total weight of the calcined molecular sieve reported on a volatile free basis. The second iron content is higher than the first iron content. In some embodiments, the second iron content is at least about 15% greater than the first iron content, or at least about 25% greater.

In a particular embodiment, the catalyst contains ion-exchanged iron and an amount of non-exchanged iron sufficient to maintain NOx conversion performance of the catalyst in an exhaust stream containing nitrogen oxides after hydrothermal or in-exhaust aging.

Substrate

According to one or more embodiments, the substrate (onto which the disclosed catalyst composition is applied to give a catalytic article, e.g., an SCR catalytic article) may be constructed of any material typically used for preparing automotive catalysts and will typically comprise a metal or ceramic honeycomb structure. As used herein, the term "substrate" refers to a monolithic material onto which the catalyst composition is applied, typically in the form of a washcoat. The substrate typically provides a plurality of wall surfaces upon which a SCR washcoat composition (e.g., comprising the metal-promoted molecular sieve disclosed herein above) is applied and adhered, thereby acting as a carrier for the catalyst composition. In one or more embodiments, the substrate is selected from one or more of a flow-through honeycomb monolith or a particulate filter, and the catalytic material(s) are applied to the substrate as a washcoat.

Figure 1B:
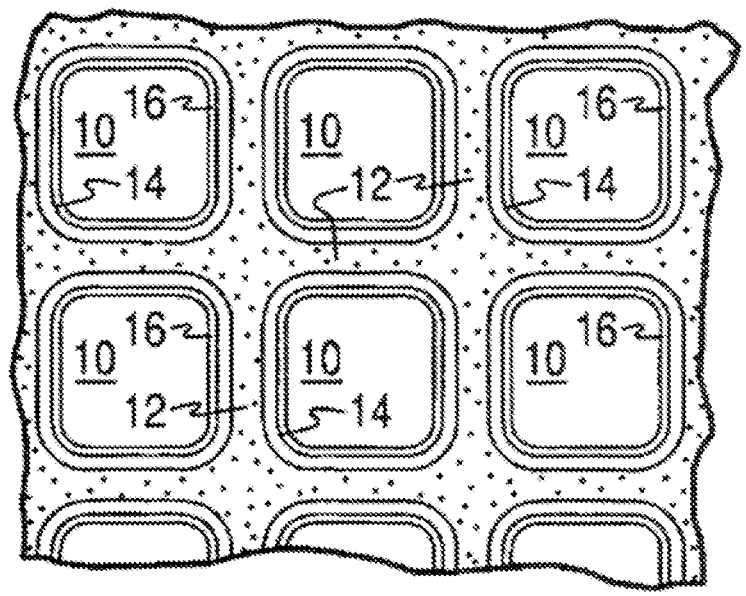
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 1B.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section. The wall thickness of flow-through substrates can vary, with a typical range being between 0.002 and 0.01 inches. A representative commercially-available flow-through substrate is a cordierite substrate having 400 cpsi and a wall thickness of 4-6 mil, or 600 cpsi and a wall thickness of 3-4 mil. However, it will be understood that the invention is not limited to a particular substrate type, material, or geometry.

Ceramic materials used to construct the substrate may include any suitable refractory material, e.g., cordierite, mullite, cordierite-α alumina, silicon carbide, aluminum titanate, silicon nitride, zircon mullite, spodumene, alumina-silica magnesia, zircon silicate, sillimanite, magnesium silicates, zircon, petalite, a alumina, aluminosilicates and the like.

Substrates useful for the catalyst of embodiments of the present invention may also be metallic in nature and be composed of one or more metals or metal alloys. A metallic substrate may include any metallic substrate, such as those with openings or "punch-outs" in the channel walls. Metallic substrates may be employed in various shapes such as pellets, corrugated sheet or monolithic foam. Exemplary metallic substrates include heat resistant metals and metal alloys, such as titanium and stainless steel, as well as other alloys in which iron is a substantial or major component. Such alloys may contain one or more of nickel, chromium, and aluminum, and the total of these metals may advantageously comprise at least about 15 wt % of the alloy, for instance, about 10 to 25 wt % chromium, about 1 to 8 wt % of aluminum, and about 0 to 20 wt % of nickel, in each case based on the weight of the substrate. The alloys may also contain small or trace amounts of one or more other metals, such as manganese, copper, vanadium, titanium and the like. The surface or the metal carriers may be oxidized at high temperatures, e.g., 1000° C. and higher, to form an alumina oxide layer on the surface of the substrate, improving the corrosion resistance of the alloy and facilitating adhesion of the washcoat layer to the metal surface.

In one or more embodiments in which the substrate is a particulate filter, the particulate filter can be selected from a gasoline particulate filter or a diesel soot filter. As used herein, the terms "particulate filter" or "soot filter" refer to a filter designed to remove particulate matter from an exhaust gas stream such as soot. Particulate filters include, but are not limited to honeycomb wall flow filters, partial filtration filters, wire mesh filters, wound fiber filters, sintered metal filters, and foam filters. In a specific embodiment, the particulate filter is a catalyzed soot filter (CSF). The catalyzed CSF comprises, for example, a substrate coated with a catalyst composition of the invention.

Wall flow substrates useful for supporting the catalyst material of one or more embodiments have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 300, cells per square inch ("cpsi"). The porous wall flow filter used in embodiments of the invention can be catalyzed in that the wall of said element has thereon or contained therein a platinum group metal. Catalytic materials may be present on the inlet side of the substrate wall alone, the outlet side alone, both the inlet and outlet sides, or the wall itself may consist all, or in part, of the catalytic material. In another embodiment, this invention may include the use of one or more catalyst layers and combinations of one or more catalyst layers on the inlet, outlet, or within walls of the filter substrate.

Figure 2:
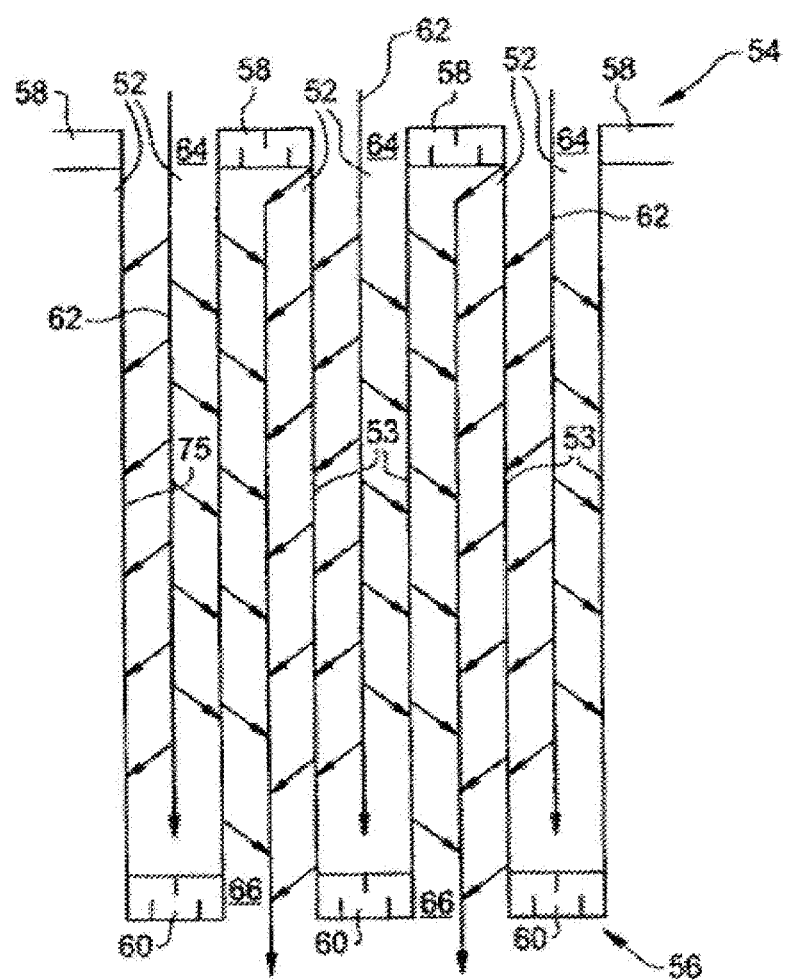
FIG. 2 shows a cross-sectional view of a section of a wall flow filter substrate.

FIG. 2 illustrates a cross-sectional view of an embodiment of a plurality of porous walls extending longitudinally from an inlet end to an outlet end of a wall flow filter substrate. A partial cross-sectional view of an embodiment of a plurality of porous walls 53 extending longitudinally from an inlet end 54 to an outlet end 56, and forming a plurality of parallel passages 52 is shown. A gas stream 62 (shown as arrows) enters through the open, unplugged end of inlet passages 64, is stopped at the closed end by outlet plug 60, and diffuses through the porous walls 53 forming the passages to the outlet passages 66. The gas stream 62 exits the filter by flowing through the open, unplugged end of outlet passages 66. The gas is prevented from flowing backwards to the inlet end of the filter from the outlet passages by the inlet plugs 58, and prevented from re-entering the inlet passages from the outlet end by the outlet plugs 60. In this manner, a quantity of the passages are inlet passages that are open at the inlet end and closed at the outlet end, and a quantity of passages are outlet passages that are closed at the inlet end and open at the outlet end, where the outlet passages are different passages than the inlet passages. The porous wall flow filter used in the invention can be catalyzed in that the wall of the substrate has therein or thereon one or more catalytic materials.

Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.008 and 0.02 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the present disclosure is not limited to a particular substrate type, material, or geometry. Note that where the substrate is a wall-flow substrate, the catalyst composition associated therewith can permeate into the pore structure of the porous walls (i.e., partially or fully occluding the pore openings) in addition to being disposed on the surface of the walls.

In some embodiments, the wall-flow filter article substrate may have a volume of 2.0 L, 2.5 L, 5.0 L, 10 L, 20 L, or 30 L; and it is to be understood that all volumes between any two of these exemplary values is also contemplated by the invention. Wall-flow filter substrates typically have a wall thickness from about 200 microns to about 500 microns, for example from about 200 microns to about 300 microns.

The walls of a wall-flow filter are porous and generally have a wall porosity of at least about 45% to least about 70% with an average pore size of at least about 5 microns to at least about 30 microns prior to disposition of the functional coating. The terms "wall porosity" and "substrate porosity" mean the same thing and are interchangeable. Porosity is the ratio of void volume within a portion of the filter wall divided by the volume in which the void fraction is measured. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

In particular embodiments, a substrate is provided which comprises a catalyst composition comprising an iron-promoted zeolite promoted with a second iron content as disclosed herein. Such a coated substrate can, in some embodiments, exhibit enhanced $NO_x$ conversion with respect to a coated substrate comprising a catalyst composition without added iron promotion. As described in more detail below, a fresh sample of the iron-promoted zeolite with a second iron content according to the present disclosure has a NOx conversion percentage at least about 15% higher, more particularly at least about 20% or 25% or 30% or 35% or 40% higher, than a fresh sample of the first iron-promoted zeolite at a temperature of 250° C.

Method of Making a Metal-Promoted SCR Composition with a Second Metal Content

According to the present disclosure, a SCR catalyst composition is generally prepared by providing a first metal-promoted molecular sieve material. As described above, in various embodiments of the present disclosure, the first metal-promoted molecular sieve material can be a low silica-alumina, iron-promoted Beta zeolite prepared by the template-free synthesis method. Methods of preparing other types of molecular sieves are known in the art and can be readily employed to provide the desired zeolite framework for inclusion within the disclosed composition. Zeolites can be prepared with a first iron content already present within the zeolite structure, or can be treated to as described below to establish the initial iron content.

The first iron-promoted zeolite is treated with additional iron to form an iron-promoted zeolite having a second iron content according to the present disclosure, with the second iron content being higher than the first iron content. To prepare metal-promoted molecular sieves having a second metal content according to various embodiments of the invention, a metal (e.g., iron) is ion exchanged into the first metal-promoted molecular sieves. Such metals are generally ion exchanged into alkali metal or $NH_4$ molecular sieves (which can be prepared by $NH_4^+$ ion exchange into an alkali metal molecular sieve by methods known in the art, e.g., as disclosed in Bleken, F. et al. Topics in Catalysis 2009, 52, 218-228, which is incorporated herein by reference).

In various embodiments, the second iron content can be added to the first iron-promoted zeolite material using an ion exchange process. For example, in certain embodiments, an in-slurry ion-exchange (ISIE) process can be used. See, e.g., the ISIE processes described in WO 2018/101718, which is incorporated by reference herein in its entirety. Any suitable form of iron can be used for this process, including iron oxide, iron sulfate, iron nitrate or iron acetate.

Substrate Coating Process

As referenced above, the catalyst composition is prepared and coated on a substrate. This method can comprise mixing a catalyst composition (or one or more components of the catalyst composition) as generally disclosed herein with a solvent (e.g., water) to form a slurry for purposes of coating a catalyst substrate. A catalyst composition comprising the metal-promoted zeolitic materials promoted with a second metal content as described herein can be prepared in the form of a slurry.

In addition to the catalyst component(s) (i.e., the metal-promoted molecular sieves having a second metal content according to the present disclosure) within a given washcoat slurry, the slurry may optionally contain various additional components. Typical additional components include, but are not limited to, one or more binders and additives to control, e.g., pH and viscosity of the slurry. Particular additional components can include binders (e.g., silica, titania, zirconia, or a combination thereof, typically in an amount of about 0.1 to about 10 weight percent, based on the weight of the zeolite), associative thickeners, and/or surfactants (including anionic, cationic, non-ionic or amphoteric surfactants) and zirconium acetate.

The slurry can, in some embodiments be milled to enhance mixing of the particles and formation of a homogenous washcoat. The milling can be accomplished in a ball mill, continuous mill, or other similar equipment, and the solids content of the slurry may be, e.g., about 20-60 wt %, more particularly about 30-40 wt %. In one embodiment, the post-milling slurry is characterized by a D90 particle size of about 5 to about 50 microns (e.g., about 5 to about 20 microns or about 10 to about 20 microns).

The slurry is generally coated on the catalyst substrate using a washcoat technique known in the art. As used herein, the term "washcoat" has its usual meaning in the art of a thin, adherent coating of a material (e.g., a catalytic material) applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or on an underlying washcoat layer. A substrate can contain one or more washcoat layers, and each washcoat layer can have unique chemical catalytic functions.

A washcoat is generally formed by preparing a slurry containing a specified solids content (e.g., 30-60% by weight) of catalyst material (here, the metal-promoted zeolite component having a second metal content) in a liquid vehicle, which is then coated onto the substrate (or substrates) and dried to provide a washcoat layer. To coat the wall flow substrates with the catalyst material of one or more embodiments, the substrates can be immersed vertically in a portion of the catalyst slurry such that the top of the substrate is located just above the surface of the slurry. In this manner, slurry contacts all walls of a flow-through monolith and for a filter monolith, contacts only the inlet face of each honeycomb wall, but is prevented from contacting the outlet face of each filter wall. The sample is left in the slurry for about 30 seconds. The substrate is removed from the slurry, and excess slurry is removed from the substrate first by allowing it to drain from the channels, then by blowing with compressed air (against the direction of slurry penetration), and then by pulling a vacuum from the direction of slurry penetration. For flow-through substrates, the resulting washcoat layer is evenly distributed on all substrate walls. For filter substrates, the catalyst slurry permeates the walls of the substrate, yet the pores are not occluded to the extent that undue back pressure will build up in the finished substrate. As used herein, the term "permeate" when used to describe the dispersion of the catalyst slurry on and into the filter substrate, means that the catalyst composition is dispersed throughout the wall of the substrate.

Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

Aging can be conducted under various conditions and, as used herein, "aging" is understood to encompass a range of conditions (e.g., temperature, time, atmosphere). Exemplary aging protocols involve subjecting the calcined coated substrate to a temperature of 650° C. for about 50 hours in 10% steam or to a temperature of 800° C. for about 16 hours in 10% steam. However, these protocols are not intended to be limiting and the temperature can be lower or higher (e.g., including but not limited to, temperatures of 400° C. and higher, e.g., 400° C. to 1000° C., 600° C. to 950° C., or 650° C. to 800° C.); the time may be lesser or greater (e.g., including but not limited to, times of about 1 hour to about 100 hours or about 2 hours to about 50 hours); and the atmosphere can be modified (e.g., to have different amounts of steam and/or other constituents present therein).

Catalyst Articles

The resulting catalyst articles (comprising one or more washcoat layers on a substrate, providing a substrate coated with a catalyst composition) can have varying configurations. In some embodiments, as referenced herein, all components of the disclosed catalyst composition (including the metal-promoted zeolite having a second metal content component) are contained within a single catalyst composition washcoat layer (i.e., a mixture), which is provided as one or more layers on the substrate. In some embodiments, a catalyst article is provided wherein the catalyst composition coated on the substrate comprises separate washcoat layers, wherein at least one washcoat layer comprises the metal-promoted zeolite described herein and at least one (separate) washcoat layer does not include the metal-promoted zeolite component having a second metal content according to the present disclosure. In this embodiment the other washcoat layer may contain PGM, specifically Pt, and together with the metal promoted zeolite of the present disclosure function as a selective ammonia oxidation catalyst (AMOx).

In one specific embodiment, a first catalyst composition washcoat layer, comprising the metal-promoted zeolite component of the present disclosure, is directly in contact with the substrate. In this specific embodiment, one exemplary catalytic article comprises a substrate having a second metal-promoted zeolite-containing washcoat layer disposed directly on the surface thereof at a loading of 0.2 to 2.0 g/in$^3$.

The washcoat(s) can be applied such that different coating layers may be in direct contact with the substrate. Alternatively, one or more "undercoats" may be present, so that at least a portion of a catalyst composition washcoat layer or layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

The resulting catalytic articles, comprising a catalyst composition as disclosed herein on a substrate, can advantageously, in some embodiments exhibit improved $NO_x$ conversion at low temperature as compared to a catalyst composition without promoter metal added in two steps. For example, a fresh sample of an iron-promoted zeolite with iron added in a second step according to the present disclosure has a NOx conversion percentage at least about 15% higher, more particularly at least about 20% or 25% or 30% or 35% or 40% higher, than a fresh sample of an initial iron-promoted zeolite without the second iron addition, at a temperature of 250° C.

Emission Treatment System

Selective reduction of nitrogen oxides utilizing catalyst compositions according to the present disclosure is generally carried out in the presence of ammonia or urea. In particular, an SCR system including a catalyst composition prepared according to the methods described herein can be integrated in the exhaust gas treatment system of a vehicle. An exemplary SCR system can include the following components: an SCR catalyst composition as described herein; a urea storage tank; a urea pump; a urea dosing system; a urea injector/nozzle; and a respective control unit.

In some aspects, the present disclosure also can relate to a method for selectively reducing nitrogen oxides ($NO_x$) from a stream, such as an exhaust gas. In particular, the stream can be contacted with a catalyst composition prepared according to the present disclosure. The term nitrogen oxides, or $NO_x$, as used herein encompasses any and all oxides of nitrogen, including but not limited to $N_2O$, $NO$, $N_2O_3$, $NO_2$, $N_2O_4$, $N_2O_5$, and $NO_3$.

In some embodiments, a catalyst composition as described herein can be effective to provide a NOR conversion of at least 60%, at least 70%, at least 80%, at least 90%, at least 95%, or at least 99% over a temperature range of about 150° C. to about 650° C., about 200° C. to about 600° C., about 300° C. to about 600° C., about 300° C. to about 550° C., about 300 to about 500° C., or about 350° C. to about 450° C. In particular embodiments, a catalyst composition can be provided to provide a NOR conversion of at least about 25% at 200° C.

The present invention also provides an emission treatment system that incorporates the SCR composition or article described herein. The SCR composition of the present invention is typically used in an integrated emissions treatment system comprising one or more additional components for the treatment of diesel exhaust gas emissions. As such, the terms "exhaust stream", "engine exhaust stream", "exhaust gas stream" and the like refer to the engine effluent as well as to the effluent upstream or downstream of one or more other catalyst system components as described herein. Such additional catalytic components include but are not limited to diesel oxidation catalysts (DOCs), catalyzed soot filters (CSFs), lean $NO_x$ traps (LNTs) and selective $NH_3$ control catalysts (AMOx).

Figure 3:
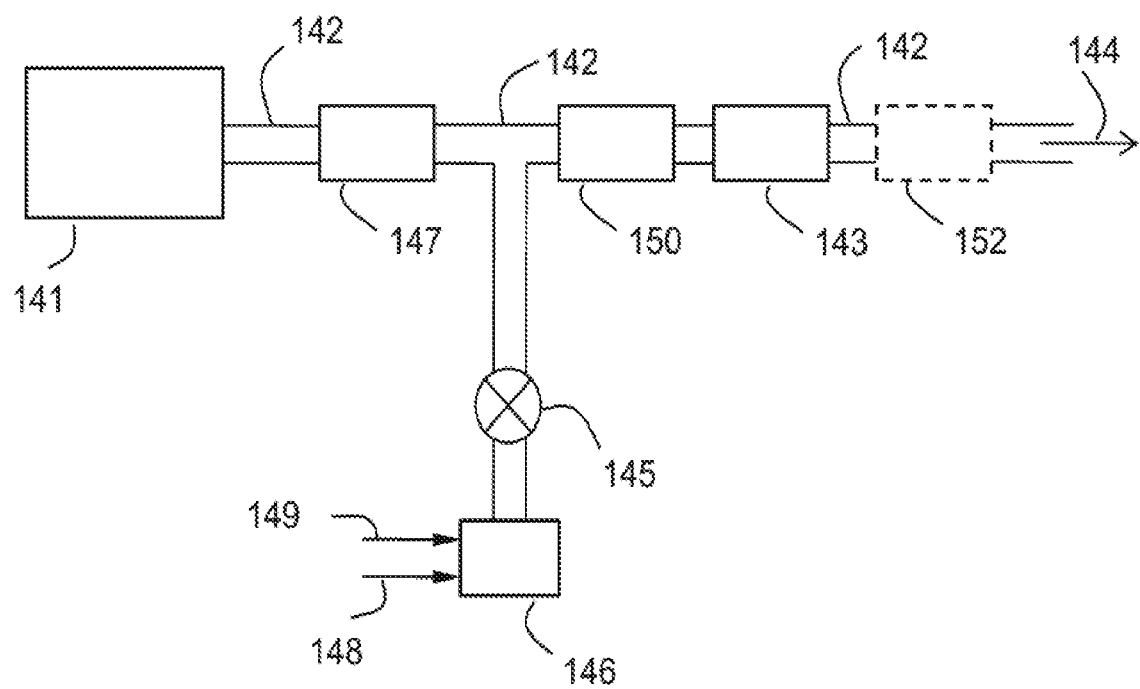
FIG. 3 shows a schematic depiction of an embodiment of an emission treatment system in which a catalyst of the present disclosure is utilized.

FIG. 3 illustrates one exemplary embodiment of an engine system comprising an emission treatment system, a urea injector, and other engine components. SCR (e.g., SCRoF) catalyst 150 as disclosed herein can be disposed directly downstream of the engine or can be downstream from another catalyst component, shown here as optional component 147. An optional additional catalyst 143 can be disposed downstream of the SCR catalyst 150, and may contain an AMOx catalyst, another SCR catalyst, and/or a catalyst to oxidize hydrocarbons and carbon monoxide. Depending on the desired level of ammonia, carbon monoxide and hydrocarbon removal, additional oxidation catalysts can be included. Specifically, an additional Cu-zeolite SCR catalyst, more specifically a Cu-CHA SCR catalyst, may be added after the Fe-BEA catalyst of this disclosure. Either the front Fe-BEA SCR catalyst or the rear Cu-CHA SCR catalyst may be applied to a soot filter forming a SCRoF. The exhaust containing gaseous pollutants (including unburned hydrocarbons, carbon monoxide and $NO_x$) and particulate matter is conveyed from the engine 141 through a connector 142 to the various components shown in FIG. 3 and the exhaust gas exits the system via the tailpipe 144. It is understood that other components, in addition to those shown in FIG. 3 can be included, upstream or downstream of SCR 150, e.g., another optional catalyst component 152.

The system shown in FIG. 3 further shows injection of a reductant, for example urea, which may be injected as a spray via a nozzle (not shown) into the exhaust stream. Aqueous urea shown on one line 148 may serve as the ammonia precursor which can be mixed with air on another line 149 in a mixing station 146. Valve 145 can be used to meter precise amounts of aqueous urea which are converted in the exhaust stream to ammonia. The exhaust stream with the added ammonia is conveyed to the SCR catalyst 150 for the SCR reaction. The injector shown is an example of one type of system that can be used, and other variants are within the scope of the disclosure.

EXPERIMENTAL

Aspects of the present invention are more fully illustrated by the following examples, which are set forth to illustrate certain aspects of the present invention and are not to be construed as limiting thereof.

Reference Example 1

A traditional Fe-promoted Beta catalyst composition having a silica-alumina ratio of 40 and a $Fe_2O_3$ loading of 1.4 wt % was used to prepare a SCR catalyst slurry at a solids content of approximately 40%. To this slurry was added zirconium acetate at a level designed to provide 5 wt % $ZrO_2$ on the calcined catalyst. This reference catalyst was washcoated onto a cellular ceramic monolith having a cell density of 400 cells per square inch (cpsi) and a wall thickness of 6 mil. Monolith samples of 1" diameter×3" long were coated, and after drying at 110° C. were calcined for 1 hour at 450° C. The washcoat, drying, and calcination was repeated to achieve a washcoat loading of 3.0 g/in³.

Comparative Example 1

An Fe-promoted Beta catalyst composition having a second iron content according to the present disclosure was prepared.

A first Fe-promoted, low SAR Beta zeolite (used for samples A and B) was synthesized by the template-free method to SAR=5. The first Fe-promoted, low SAR Beta zeolite had a first iron content of about 4.7 wt %, calculated as $Fe_2O_3$ and based on the total weight of the zeolite material.

A catalyst composition comprising the first Fe-promoted, low SAR Beta zeolite with 4.7 wt % $Fe_2O_3$ was added to water along with zirconium acetate designed to provide 5 wt % $ZrO_2$ on the calcined catalyst. The final washcoat slurry was adjust to about 30-40% solids after milling.

After preparing the washcoat slurry, catalysts were prepared by coating 400 cpsi, 6 mil monoliths, 1" diameter×3" long. After drying at 110° C., samples were calcined for 1 hour at 450° C. The coating process provided a catalyst washcoat loading of 2.1 g/in³.

Example 1

An in-slurry ion exchange process was used to add additional iron to the first zeolite material to form a second Fe-promoted low SAR Beta zeolite having a second iron content (used for samples C and D). The second Fe-promoted low SAR Beta zeolite according to the present disclosure had a second iron content of about 6.6 wt %, calculated as $Fe_2O_3$ and based on the total weight of the zeolite material.

A catalyst composition comprising the second Fe-promoted, low SAR Beta zeolite was prepared by mixing the first Fe-promoted, low SAR zeolite with 4.7 wt % $Fe_2O_3$ (used for Comparative Example 1) into water with zirconium acetate and iron nitrate designed to provide 5 wt % $ZrO_2$ and an additional 1.9 wt % $Fe_2O_3$ based on the zeolite loading after calcination. The final washcoat slurry was adjust to about 30-40% solids after milling.

After preparing the washcoat slurry, catalysts were prepared by coating 400 cpsi, 6 mil monoliths, 1" diameter×3" long. After drying at 110° C., samples were calcined for 1 hour at 450° C. The coating process provided a catalyst washcoat loading of 2.1 $g/in^3$.

Comparative Example 2

An Fe-promoted Beta catalyst composition having a second iron content according to the present disclosure was prepared.

A first Fe-promoted, low SAR Beta zeolite (used for samples E and F) was synthesized by the template-free method to SAR=5. The first Fe-promoted, low SAR Beta zeolite had a first iron content of about 7.4 wt %, calculated as $Fe_2O_3$ and based on the total weight of the zeolite material.

A catalyst composition comprising the first Fe-promoted, low SAR Beta zeolite with 7.4 wt % $Fe_2O_3$ was added to water along with zirconium acetate designed to provide 5 wt % $ZrO_2$ on the calcined catalyst. The final washcoat slurry was adjust to about 30-40% solids after milling.

After preparing the washcoat slurry, catalysts were prepared by coating 400 cpsi, 6 mil monoliths, 1" diameter×3" long. After drying at 110° C., samples were calcined for 1 hour at 450° C. The coating process provided a catalyst washcoat loading of 2.1 $g/in^3$.

Example 2

An in-slurry ion exchange process was used to add additional iron to the zeolite material to form a second Fe-promoted, low SAR Beta zeolite having a second iron content according to the present disclosure (used for samples G and H). The second Fe-promoted, low SAR Beta zeolite had a second iron content of about 8.5 wt %, calculated as $Fe_2O_3$ and based on the total weight of the zeolite material.

A catalyst composition comprising the second Fe-promoted, low SAR Beta zeolite was prepared by mixing the first Fe-promoted, low SAR zeolite with 7.4 wt % $Fe_2O_3$ (used for Comparative Example 2) into water with zirconium acetate and iron nitrate designed to provide 5 wt % $ZrO_2$ and an additional 1.1 wt % $Fe_2O_3$ based on the zeolite loading after calcination. The final washcoat slurry was adjust to about 30-40% solids after milling.

After preparing the washcoat slurry, catalysts were prepared by coating 400 cpsi, 6 mil monoliths, 1" diameter×3" long. After drying at 110° C., samples were calcined for 1 hour at 450° C. The coating process provided a catalyst washcoat loading of 2.1 $g/in^3$.

Table 1 below summarizes the SAR value, first, added, and second iron weight percentages, and the washcoat loadings for the reference example, the two comparative examples, and the two examples prepared to methods disclosed herein.

TABLE 1

| Sample ID | Beta SAR | First $Fe_2O_3$ (wt %) | Added $Fe_2O_3$ (wt %) | Second $Fe_2O_3$ (wt %) | Washcoat Loading ($g/in^3$) |
|---|---|---|---|---|---|
| Ref Ex | 40 | 1.4 | | | 3.0 |
| Comp Ex 1 | 5 | 4.7 | | | 2.1 |
| Example 1 | 5 | 4.7 | 1.9 | 6.6 | 2.1 |
| Comp Ex 2 | 5 | 7.4 | | | 2.1 |
| Example 2 | 5 | 7.4 | 1.1 | 8.5 | 2.1 |

Example 3

Samples C and D of SCR catalytic articles comprising a second Fe-promoted, low SAR Beta zeolite catalyst composition, prepared according to Example 1 above, were evaluated for deNOx performance. For comparative purposes, samples A and B of SCR catalytic articles comprising a first Fe-promoted, low SAR Beta zeolite catalyst composition were prepared according to Comparative Example 1 above and were also evaluated for deNOx performance. SCR samples were prepared by washcoating a catalyst slurry onto a substrate as described.

Hydrothermal treatment of catalyzed monolith samples was performed in a tube furnace with steam by allowing gas with approximately 10% O2 and 10% $H_2O$ in $N_2$ to flow through the sample at 650° C. for 50 hours with a space velocity of 9,000/h.

Samples were evaluated in a laboratory reactor using a simulated exhaust gas comprising 500 ppm NOx (standard SCR conditions with $NO_2/NOx=0$), 500 ppm $NH_3$, 10% $O_2$, 5% $H_2O$ at a space velocity of 80,000/h, with a 0.5° C./min temperature ramp from 200° to 600° C. For comparison the NOx conversion at 250°, 350° and 450° C. are tabulated in Table 2 below, along with the peak $N_2O$ formation in ppm (usually near 350° C.).

TABLE 2

| Sample | ID | State | 250° C. NOx (%) | 350° C. NOx (%) | 450° C. NOx (%) | peak $N_2O$ (ppm) |
|---|---|---|---|---|---|---|
| Ref Ex | | Fresh | 40 | 81 | 92 | 2 |
| Ref Ex | | Aged | 15 | 62 | 85 | 2 |
| Comp Ex 1 | A | Fresh | 43 | 91 | 98 | 3 |
| Comp Ex 1 | B | Aged | 28 | 84 | 93 | 2 |
| Example 1 | C | Fresh | 68 | 92 | 98 | 1 |
| Example 1 | D | Aged | 32 | 86 | 95 | 1 |

Figure 4:
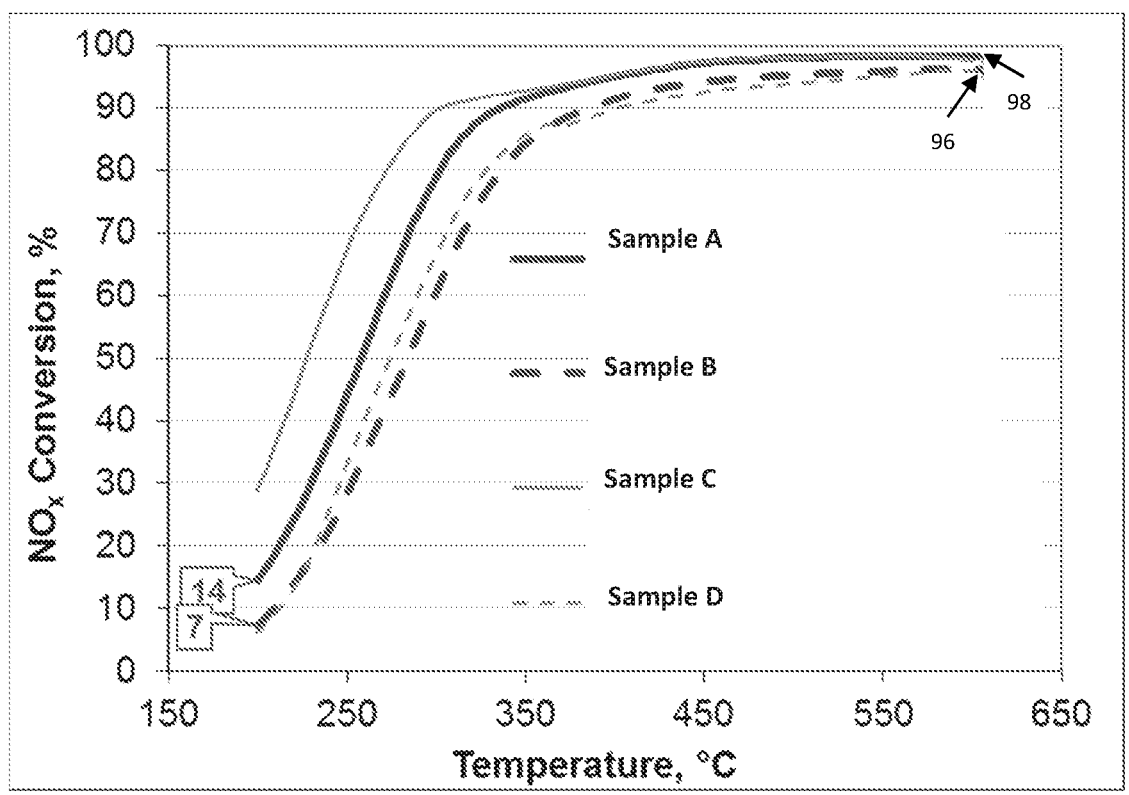
FIG. 4 is a graph of NOx conversion over a range of temperatures for fresh and aged SCR catalyst samples according to the present disclosure and for fresh and aged comparative SCR catalyst samples.

FIG. 4 provides a graph showing NOx conversion percentages over a wide temperature range for fresh and aged samples (samples C and D respectively) of the SCR catalytic articles comprising a second Fe-promoted, low SAR Beta zeolite catalyst composition according to the present disclosure, and for fresh and aged samples (samples A and B respectively) of the SCR catalytic articles comprising a first Fe-promoted, low SAR Beta zeolite catalyst composition.

As shown in FIG. 4, at a temperature of about 250° C., the fresh SCR catalytic articles comprising a second Fe-promoted, low SAR Beta zeolite catalyst composition according to the present disclosure (sample C) provide a NOx conversion of about 68%. At a temperature of about 250° C., the fresh SCR catalytic articles comprising a first Fe-promoted, low SAR Beta zeolite catalyst composition (comparative sample A) provide a NOx conversion of about 43%. Accordingly, for fresh samples, the SCR catalyst compositions of the present disclosure provide at least about a 25% increase in NOx conversion as compared to SCR catalysts having only a single iron promotion.

As shown in FIG. 4, at a temperature of about 250° C., the aged SCR catalytic articles comprising a second Fe-promoted, low SAR Beta zeolite catalyst composition according to the present disclosure (sample D) provide a NOx conversion of about 32%. At a temperature of about 250° C., the aged SCR catalytic articles comprising a first Fe-promoted, low SAR Beta zeolite catalyst composition (comparative sample B) provide a NOx conversion of about 28%. Accordingly, for aged samples, the SCR catalyst compositions of the present disclosure provide an increase in NOx conversion as compared to SCR catalysts having only a single iron promotion. Peak $N_2O$ values are within experimental error, meaning that the improvement in NOx conversion by adding additional iron according to the inventive method did not negatively impact selectivity towards $N_2O$.

Example 4

Samples G and H of SCR catalytic articles comprising a second Fe-promoted, low SAR Beta zeolite catalyst composition, prepared according to Example 2 above, were evaluated for deNOx performance. For comparative purposes, samples E and F of SCR catalytic articles comprising a first Fe-promoted, low SAR Beta zeolite catalyst composition were prepared according to Comparative Example 2 above and were also evaluated for deNOx performance. SCR samples were prepared by washcoating a catalyst slurry onto a substrate as described.

Samples for Comparative Example 2 and Example 2 were aged and evaluated using the same methodology described for Example 3. For comparison the NOx conversion at 250°, 350° and 450° C. are tabulated in Table 3 below, along with the peak $N_2O$ formation in ppm (usually near 350° C.).

TABLE 3

| Sample | ID | State | 250° C. NOx (%) | 350° C. NOx (%) | 450° C. NOx (%) | peak $N_2O$ (ppm) |
| --- | --- | --- | --- | --- | --- | --- |
| Comp Ex 2 | E | Fresh | 63 | 93 | 97 | 1 |
| Comp Ex 2 | F | Aged | 13 | 71 | 91 | 1 |
| Example 2 | G | Fresh | 81 | 96 | 85 | 2 |
| Example 2 | H | Aged | 39 | 81 | 95 | 2 |

Figure 5:
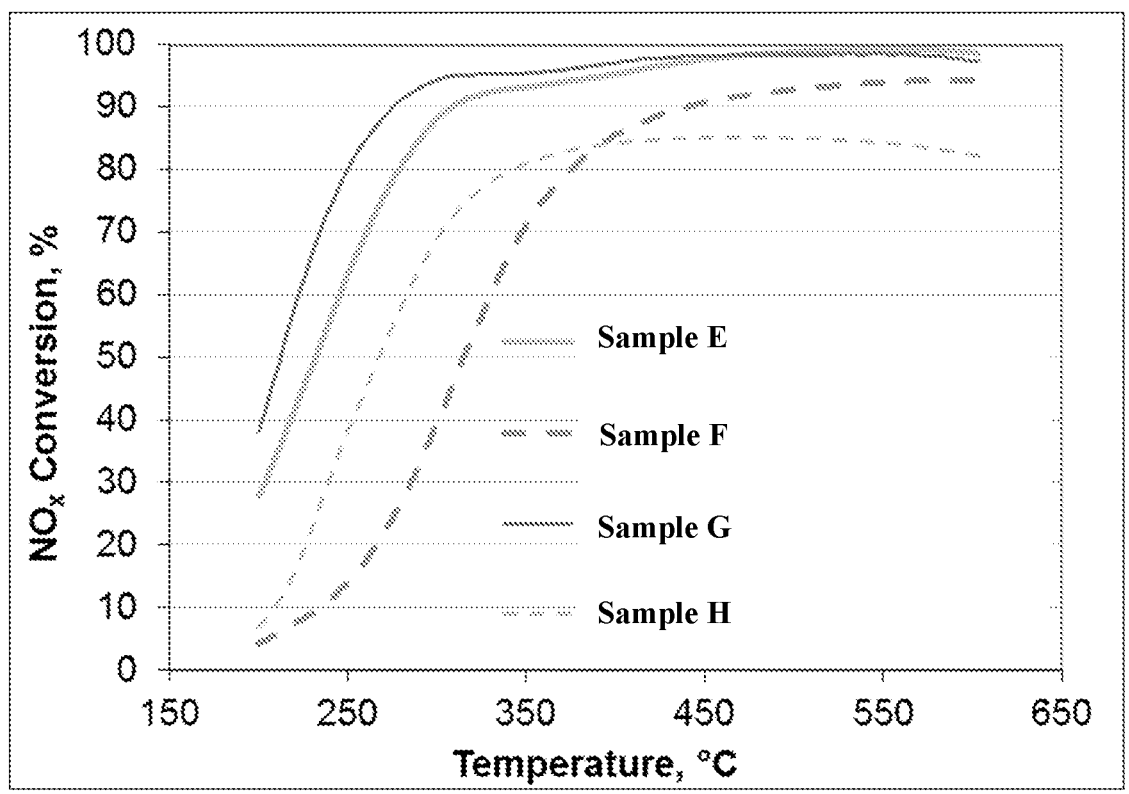
FIG. 5 is a graph of NOx conversion over a range of temperatures for fresh and aged SCR catalyst samples according to the present disclosure and for fresh and aged comparative SCR catalyst samples.

FIG. 5 provides a graph showing NOx conversion percentages over a wide temperature range for fresh and aged samples (samples G and H respectively) of the SCR catalytic articles comprising a second Fe-promoted, low SAR Beta zeolite catalyst composition having a second iron content according to the present disclosure, and for fresh and aged samples (samples E and F respectively) of the SCR catalytic articles comprising a first Fe-promoted, low SAR Beta zeolite catalyst composition.

As shown in FIG. 5, at a temperature of about 250° C., the fresh SCR catalytic articles comprising a second Fe-promoted, low SAR Beta zeolite catalyst composition according to the present disclosure (sample G) provide a NOx conversion of about 81%. At a temperature of about 250° C., the fresh SCR catalytic articles comprising a first Fe-promoted, low SAR Beta zeolite catalyst composition (comparative sample E) provide a NOx conversion of about 63%. Accordingly, for fresh samples, the SCR catalyst compositions of the present disclosure provide at least about a 18% increase in NOx conversion as compared to SCR catalysts having only a single iron promotion.

As shown in FIG. 5, at a temperature of about 250° C., the aged SCR catalytic articles comprising a second Fe-promoted, low SAR Beta zeolite catalyst composition according to the present disclosure (sample H) provide a NOx conversion of about 39%. At a temperature of about 250° C., the aged SCR catalytic articles comprising a first Fe-promoted, low SAR Beta zeolite catalyst composition (comparative sample F) provide a NOx conversion of about 13%. Accordingly, for aged samples, the SCR catalyst compositions of the present disclosure provide at least about a 26% increase in NOx conversion as compared to SCR catalysts having only a single iron promotion. Peak $N_2O$ values are within experimental error, meaning that the improvement in NOx conversion by adding additional iron according to the inventive method did not negatively impact selectivity towards $N_2O$.

Example 5

The data for the Example 1 (double Fe exchange with a total $Fe_2O_3$ loading of 6.6 wt %) was compared to that of Comparative Example 2 (single Fe exchange with a $Fe_2O_3$ loading of 7.4 wt %).

At a temperature of about 250° C., the fresh SCR catalytic articles of Example 1 comprising a second Fe-promoted, low SAR Beta zeolite catalyst composition according to the present disclosure (sample C) provide a NOx conversion of about 68%. The fresh SCR catalytic articles comprising a first Fe-promoted, low SAR Beta zeolite catalyst composition (comparative sample E) provide a NOx conversion of about 63%. Accordingly, for fresh samples, the SCR catalyst compositions of the present disclosure provide at least about a 5% increase in NOx conversion as compared to SCR catalysts having only a single iron promotion, even with 0.8 wt % less $Fe_2O_3$.

In the comparison of aged catalysts, at a temperature of about 250° C., the aged SCR catalytic articles comprising a second Fe-promoted, low SAR Beta zeolite catalyst composition according to the present disclosure (sample D) provide a NOx conversion of about 32%. The aged SCR catalytic articles comprising a first Fe-promoted, low SAR Beta zeolite catalyst composition (comparative sample F) provide a NOx conversion of about 13%. Accordingly, for aged samples, the SCR catalyst compositions of the present disclosure provide at least about a 19% increase in NOx conversion as compared to SCR catalysts having only a single iron promotion, even with 0.8 wt % less $Fe_2O_3$.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed is:

1. A method of forming a selective catalytic reduction (SCR) catalyst, the method comprising:
   receiving a first iron-promoted zeolite having a first iron content; and
   treating the iron-promoted zeolite with additional iron in an ion exchange step to form a second iron-promoted zeolite with a second iron content, the second iron content being higher than the first iron content.

2. The method of claim 1, wherein the first iron content is from about 2 to about 8 wt % and the second iron content is about 6 to about 10 wt %, based on the total weight of the iron-promoted zeolite.

3. The method of claim 1, wherein the second iron content is at least about 15% greater than the first iron content.

4. The method of claim 1, wherein the iron-promoted zeolite is a zeolitic material having a BEA framework structure.

5. The method of claim 4, wherein the zeolitic material having a BEA framework structure is obtained from an organo-template-free synthetic process.

6. The method of claim 1, wherein the iron-promoted zeolite has a silica-to-alumina molar ratio (SAR) of about 10 or less.

7. The method of claim 1, wherein the iron-promoted zeolite has a silica-to-alumina molar ratio (SAR) of about 5 or less.

8. The method of claim 1, wherein the catalyst contains ion-exchanged iron and an amount of non-exchanged iron sufficient to maintain NOx conversion performance of the catalyst in an exhaust stream containing nitrogen oxides after hydrothermal aging of the catalyst.

9. The method of claim 1, wherein a fresh sample of the second iron-promoted zeolite with a second iron content has a NOx conversion percentage at least about 15% higher than a fresh sample of the first iron-promoted zeolite at a temperature of 250° C.

10. The method of claim 1, further comprising preparing an SCR catalyst article by coating a flow-through ceramic or metallic substrate with the second iron-promoted zeolite.

11. The method of claim 1, further comprising a porous wall-flow filter substrate.

12. An iron-promoted zeolite made according to the method of claim 1.

13. A selective catalytic reduction (SCR) catalyst composition comprising an iron-promoted, low SAR Beta zeolite having an SAR of less than about 10, and comprising at least about 6 weight percent iron, based on total weight of the iron-promoted zeolite, wherein the iron content of the Beta zeolite was added to the zeolite in at least two separate steps.

14. The SCR catalyst composition of claim 13, wherein the catalyst composition is disposed on a flow-through or wall-flow filter substrate.

15. An engine exhaust gas treatment system comprising a catalyst composition made according to claim 1 and an exhaust gas conduit in fluid communication with a lean burn engine, wherein the catalyst composition is downstream of the exhaust gas conduit.

16. The engine exhaust gas treatment system of claim 15, wherein the engine is a diesel engine.

17. The engine exhaust gas treatment system of claim 15, wherein the low SCR, Fe-promoted Beta zeolite SCR catalyst is preceded by a DOC and/or CSF catalyst and may be followed by an additional Cu-zeolite SCR catalyst and/or a selective ammonia oxidation catalyst (AMOx); wherein the Cu-zeolite SCR catalyst and AMOx catalyst are comprised of Cu—CHA.

18. A method of removing nitrogen oxides from exhaust gas from a lean burn engine, the method comprising contacting an exhaust gas stream from a lean burn engine with the catalyst composition prepared according to claim 1.

* * * * *